US012121016B2

(12) United States Patent
Campbell

(10) Patent No.: US 12,121,016 B2
(45) Date of Patent: Oct. 22, 2024

(54) LICE REPELLANT ASSEMBLY

(71) Applicant: Danielle Campbell, Freeburg, IL (US)

(72) Inventor: Danielle Campbell, Freeburg, IL (US)

( * ) Notice: Subject to any disclaimer, the term of this patent is extended or adjusted under 35 U.S.C. 154(b) by 643 days.

(21) Appl. No.: 17/032,572

(22) Filed: Sep. 25, 2020

(65) Prior Publication Data

US 2022/0095606 A1    Mar. 31, 2022

(51) Int. Cl.
*A01M 29/18* (2011.01)
*A45D 8/34* (2006.01)
*A45D 8/36* (2006.01)

(52) U.S. Cl.
CPC ............... *A01M 29/18* (2013.01); *A45D 8/34* (2013.01); *A45D 8/36* (2013.01)

(58) Field of Classification Search
CPC .......... A01M 29/16; A01M 29/18; A45D 8/36
See application file for complete search history.

(56) References Cited

U.S. PATENT DOCUMENTS

| 4,689,776 | A  | * | 8/1987 | Thorndyke | G10K 9/22 367/137 |
| 7,090,345 | B2 | * | 8/2006 | Pierce | B41J 29/13 347/108 |
| 7,503,624 | B2 | * | 3/2009 | Hoffman | A47C 1/0242 297/69 |
| 8,394,092 | B2 | * | 3/2013 | Brannan | H01R 43/00 606/41 |
| 2002/0096125 | A1 | | 7/2002 | Fong | |
| 2006/0198245 | A1 | * | 9/2006 | Cheung | A42B 1/24 367/139 |
| 2009/0018653 | A1 | * | 1/2009 | Bashiri | A61B 17/12022 307/112 |
| 2017/0347767 | A1 | | 12/2017 | Hudson | |

FOREIGN PATENT DOCUMENTS

| WO | 2009019705 | 2/2009 |
| WO | 2015132777 | 9/2015 |
| WO | 2016067287 | 5/2016 |

\* cited by examiner

*Primary Examiner* — Daniell L Negron

(57) ABSTRACT

A lice repellant assembly for repelling head lice includes an article of head gear that can be worn on a user's head. A sound emitter is disposed on the article of head gear. The sound emitter emits sound waves outwardly therefrom. Moreover, the sound emitter has an operational frequency of at least 20.0 Hz to repel lice from the user.

6 Claims, 4 Drawing Sheets

LICE REPELLANT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to repellant devices and more particularly pertains to a new repellant device for repelling head lice.

(2) Description of Related Art Including Information Disclosed Under 37 CFR 1.97 and 1.98

The prior art relates to repellant devices including a hair grooming device that has an ultrasonic wave generator integrated therein for repelling head lice. The prior art discloses an article of head gear that has a non-toxic lice repellent being infused therein for repelling head lice. The prior art discloses a hair scrunchie that is impregnated with rosemary oil for repelling head lice. Additionally, the prior art discloses a wearable device that releases a lice-repelling fluid.

BRIEF SUMMARY OF THE INVENTION

An embodiment of the disclosure meets the needs presented above by generally comprising an article of head gear that can be worn on a user's head. A sound emitter is disposed on the article of head gear. The sound emitter emits sound waves outwardly therefrom. Moreover, the sound emitter has an operational frequency of at least 20.0 Hz to repel lice from the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
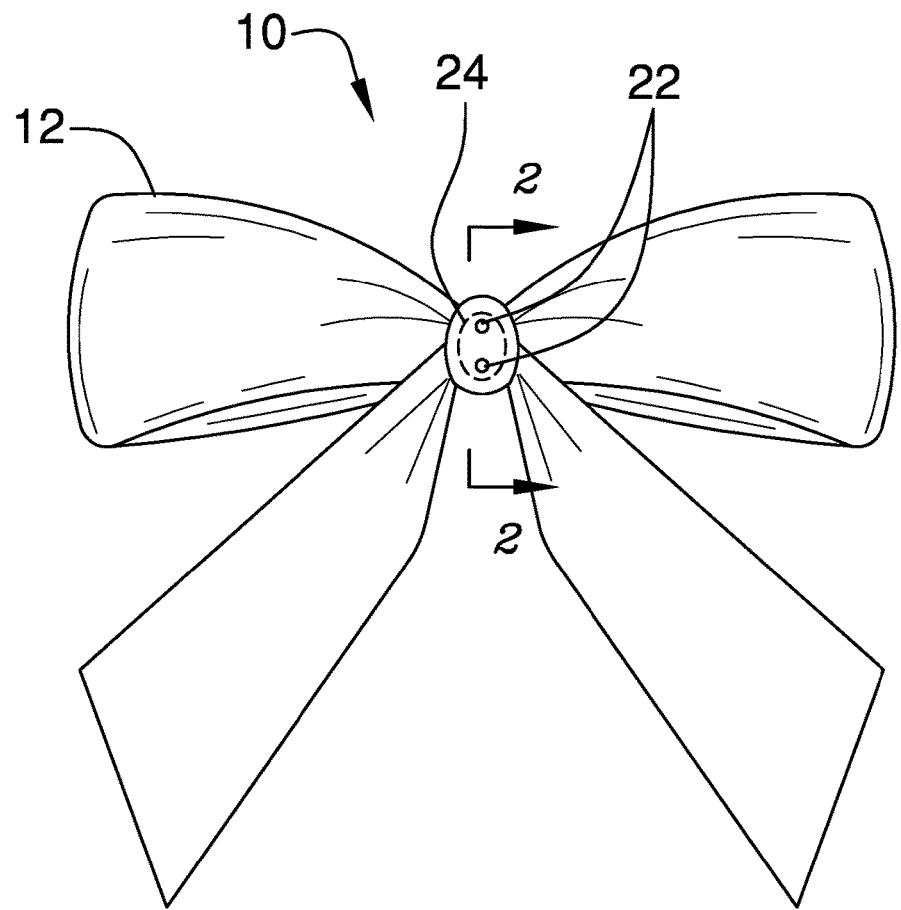
FIG. 1 is a front phantom view of a lice repellant assembly according to an embodiment of the disclosure.
Figure 2:
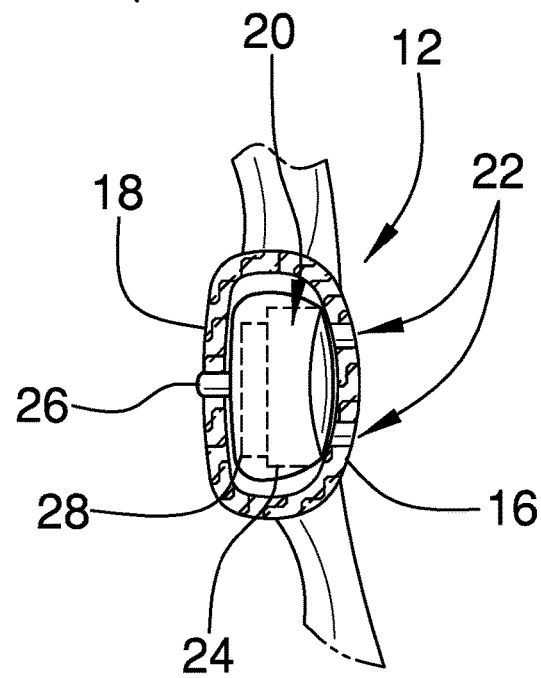
FIG. 2 is a cross sectional view taken along line 2-2 of FIG. 1 of an embodiment of the disclosure.
Figure 3:
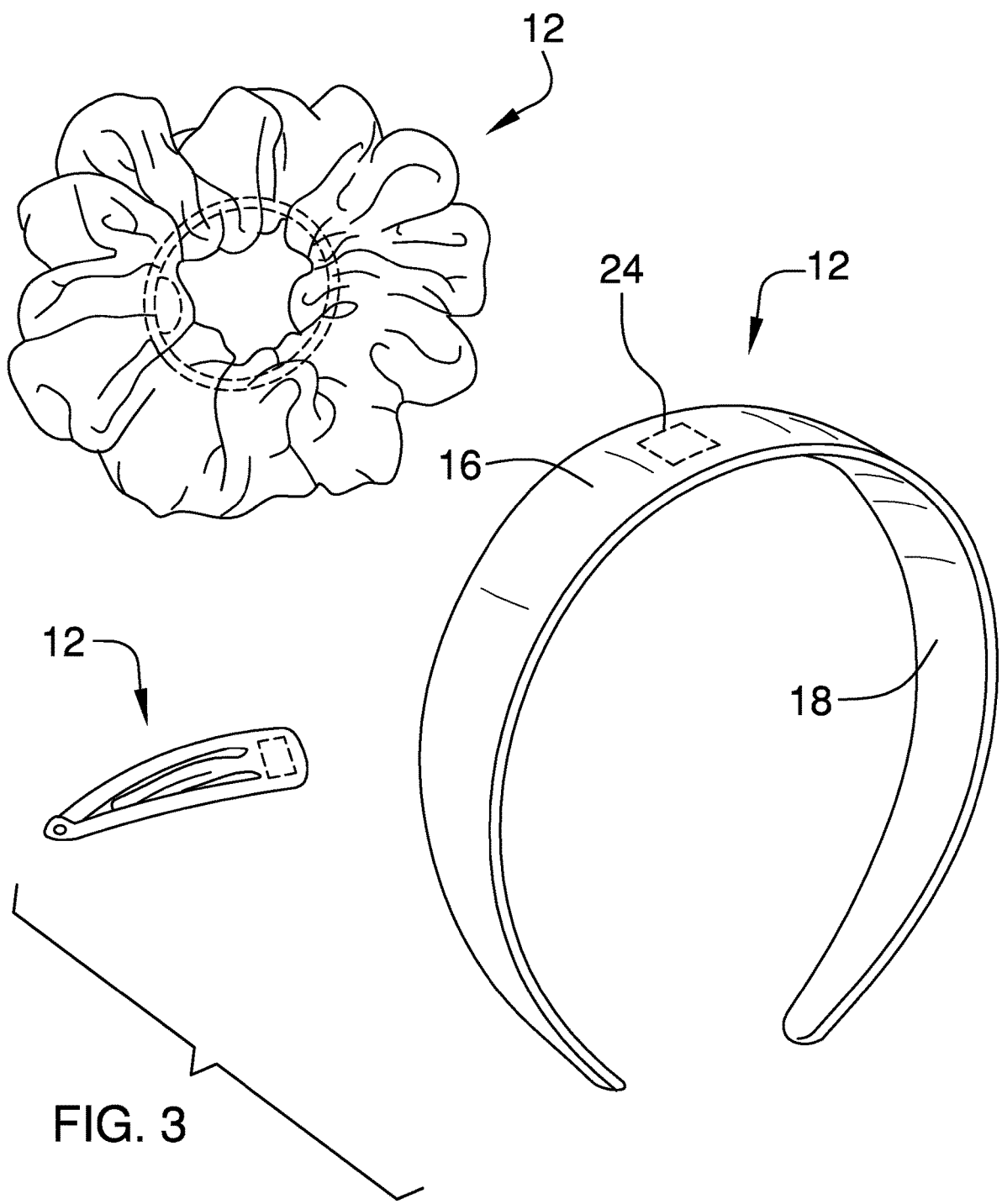
FIG. 3 is a perspective view of an embodiment of the disclosure.
Figure 4:
FIG. 4 is a perspective in-use view of an embodiment of the disclosure.
Figure 5:
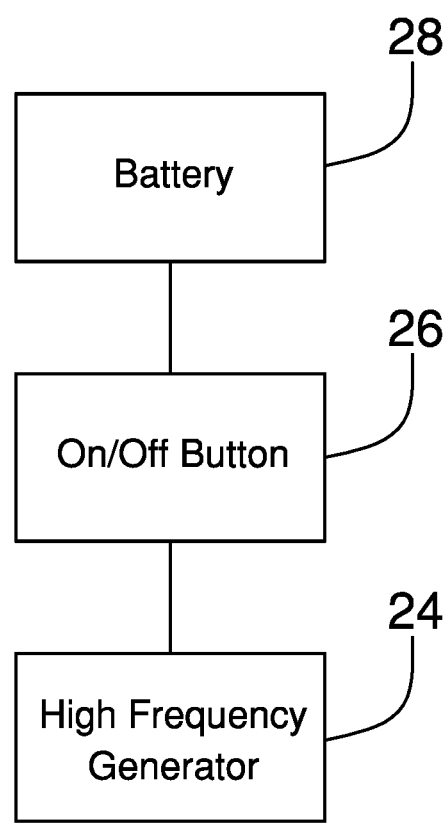
FIG. 5 is a schematic view of an embodiment of the disclosure.

With reference now to the drawings, and in particular to FIGS. 1 through 5 thereof, a new repellant device embodying the principles and concepts of an embodiment of the disclosure and generally designated by the reference numeral 10 will be described.

As best illustrated in FIGS. 1 through 5, the lice repellant assembly 10 generally comprises an article of head gear 12 that can be worn on a user's head 14. As is most clearly shown in FIGS. 1 and 4, the article of head gear 12 may comprise a ribbon tied into a bow. As is most clearly shown in FIG. 3, the article of head gear 12 may comprise a head band, a hair scrunchie, or a barrette. The article of head gear 12 has a front side 16 and a back side 18, and the article of head gear 12 has a chamber 20 positioned between the front side 16 and the back side 18. Additionally, the article of head gear 12 has a plurality of sound holes 22 each extending into the chamber 20 to pass sound outwardly from the chamber 20.

A sound emitter 24 is disposed on the article of head gear 12 to emit sound waves outwardly therefrom. The sound emitter 24 has an operational frequency of at least 20.0 Hz to repel lice from the user. The sound emitter 24 is positioned within the chamber 20 in the article of head gear 12. Additionally, the sound emitter 24 may comprise a piezo transducer or other similar electronic device that is capable of producing ultrasonic sound waves.

A power button 26 is movably disposed on the article of head gear 12 and the power button 26 is electrically coupled to the sound emitter 24. The power button 26 turns the sound emitter 24 on and off. The power button 26 is positioned on the article of head gear 12 such that the power button 26 extends from the article of head gear 12 towards the user's head 14. Thus, the power button 26 is actuated by compressing the article of head gear 12 into the user's head 14. A power supply 28 is provided and the power supply 28 is positioned in the chamber 20. The power supply 28 is electrically coupled to the sound emitter 24 and the power supply 28 comprises at least one battery.

In use, the article of head gear 12 is worn on the user's head 14 and the power button 26 is manipulated to turn on the sound emitter 24. Thus, the sound emitter 24 emits the ultrasonic sound waves outwardly from the article of head gear 12. In this way the sound emitter 24 repels head lice from accumulating on the user's head 14. Moreover, the sound emitter 24 facilitates head lice to be controlled without the use of insecticides or other toxic chemicals.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lice repellant assembly being wearable on a user for repelling lice from the user, said assembly comprising:
    an article of head gear being configured to be worn on a user's head; and
    a sound emitter being disposed on said article of head gear wherein said sound emitter is configured to emit sound waves outwardly therefrom, said sound emitter having an operational frequency of at least 20.0 Hz wherein said sound emitter is configured to repel lice from the user; and
    a power button being movably disposed on said article of head gear, said power button being electrically coupled to said sound emitter, said power button turning said sound emitter on and off, said power button being positioned on said article of head gear wherein said power button is configured to extend from said article of head gear towards the user's head wherein said power button is configured to be actuated by compressing said article of head gear into the user's head.

2. The assembly according to claim 1, wherein said article of head gear has a front side and a back side, said article of head gear having a chamber being positioned between said front side and said back side.

3. The assembly according to claim 2, wherein said article of head gear has a plurality of sound holes each extending into said chamber wherein said plurality of sound holes is configured to pass sound outwardly from said chamber.

4. The assembly according to claim 2, wherein said sound emitter is positioned within said chamber in said article of head gear.

5. The assembly according to claim 2, further comprising a power supply being positioned in said chamber, said power supply being electrically coupled to said sound emitter, said power supply comprising at least one battery.

6. A lice repellant assembly being wearable on a user for repelling lice from the user, said assembly comprising:
    an article of head gear being configured to be worn on a user's head, said article of head gear having a front side and a back side, said article of head gear having a chamber being positioned between said front side and said back side, said article of head gear having a plurality of sound holes each extending into said chamber wherein said plurality of sound holes is configured to pass sound outwardly from said chamber;
    a sound emitter being disposed on said article of head gear wherein said sound emitter is configured to emit sound waves outwardly therefrom, said sound emitter having an operational frequency of at least 20.0 Hz wherein said sound emitter is configured to repel lice from the user, said sound emitter being positioned within said chamber in said article of head gear;
    a power button being movably disposed on said article of head gear, said power button being electrically coupled to said sound emitter, said power button turning said sound emitter on and off, said power button being positioned on said article of head gear wherein said power button is configured to extend from said article of head gear towards the user's head wherein said power button is configured to be actuated by compressing said article of head gear into the user's head; and
    a power supply being positioned in said chamber, said power supply being electrically coupled to said sound emitter, said power supply comprising at least one battery.

* * * * *